(12) United States Patent
Liu et al.

(10) Patent No.: US 11,892,631 B2
(45) Date of Patent: Feb. 6, 2024

(54) NEAR-EYE DISPLAY DEVICE AND NEAR-EYE DISPLAY SYSTEM

(71) Applicants: Beijing BOE Display Technology Co., Ltd., Beijing (CN); BOE Technology Group Co., Ltd., Beijing (CN)

(72) Inventors: Xiaoru Liu, Beijing (CN); Hongshu Zhang, Beijing (CN); Lianjie Qu, Beijing (CN); Xiaoling Xu, Beijing (CN); Jun Wu, Beijing (CN); Ruiyong Wang, Beijing (CN); Pingqi Zhang, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 875 days.

(21) Appl. No.: 16/962,273

(22) PCT Filed: Feb. 17, 2020

(86) PCT No.: PCT/CN2020/075607
§ 371 (c)(1),
(2) Date: Jul. 15, 2020

(87) PCT Pub. No.: WO2020/177522
PCT Pub. Date: Sep. 10, 2020

(65) Prior Publication Data
US 2021/0364800 A1    Nov. 25, 2021

(30) Foreign Application Priority Data
Mar. 5, 2019  (CN) .......................... 201910165343.6

(51) Int. Cl.
*G02B 27/01* (2006.01)
*F21V 8/00* (2006.01)

(52) U.S. Cl.
CPC ....... *G02B 27/0172* (2013.01); *G02B 6/0003* (2013.01); *G02B 6/005* (2013.01); *G02B 6/0023* (2013.01); *G02B 6/0076* (2013.01)

(58) Field of Classification Search
CPC ............ G02B 27/0944; G02B 27/1026; G02B 27/0146; G02B 5/1866; G02B 6/0003;
(Continued)

(56) References Cited

U.S. PATENT DOCUMENTS

2016/0320541 A1    11/2016  Kim
2016/0327219 A1    11/2016  Hashiya et al.
(Continued)

FOREIGN PATENT DOCUMENTS

CN   102096134 A   6/2011
CN   102654731 A   9/2012
(Continued)

OTHER PUBLICATIONS

Chinese Office Action for corresponding application 201910165343.6 dated Mar. 13, 2020.
(Continued)

*Primary Examiner* — Audrey Y Chang
(74) *Attorney, Agent, or Firm* — ArentFox Schiff LLP; Michael Fainberg (57) ABSTRACT

Disclosed are a near-eye display device and a near-eye display system. The excitation light source structure provides excitation light to the first waveguide structure, and the outgoing coupling grating structure corresponding to the first waveguide structure receiving the excitation light may be further irradiated by the excitation light, and be excited and output the light with a pixel color corresponding to the first waveguide structure. That is, the outgoing coupling grating structure corresponding to the first waveguide structure receiving the excitation light can derive the light with
(Continued)

the corresponding pixel color emitted by the projection-based display, and be excited by the excitation light emitted by the excitation light source structure to output light with a pixel color corresponding to the first waveguide structure.

14 Claims, 7 Drawing Sheets

(58) Field of Classification Search
CPC ... G02B 6/0023; G02B 6/0076; H01L 33/504; C09K 11/06
USPC .......................................... 359/34, 630, 569
See application file for complete search history.

(56) References Cited

U.S. PATENT DOCUMENTS

| | | | | |
|---|---|---|---|---|
| 2016/0327706 A1* | 11/2016 | Hirasawa | ........... | C09K 11/7774 |
| 2017/0235142 A1* | 8/2017 | Wall | .......... | G02B 5/26 |
| | | | | 359/633 |
| 2018/0284460 A1* | 10/2018 | Cheng | ................ | G02B 27/0944 |
| 2018/0299678 A1 | 10/2018 | Singer et al. | | |
| 2019/0064601 A1 | 2/2019 | Wei | | |
| 2019/0348577 A1* | 11/2019 | Pathak | ................ | H01L 33/0075 |

FOREIGN PATENT DOCUMENTS

| | | |
|---|---|---|
| CN | 104570191 A | 4/2015 |
| CN | 104763949 A | 7/2015 |
| CN | 105940510 A | 9/2016 |
| CN | 107479253 A | 12/2017 |
| CN | 108490682 A | 9/2018 |
| CN | 208188393 U | 12/2018 |
| CN | 109839746 A | 6/2019 |
| WO | 2017102795 A1 | 6/2017 |

OTHER PUBLICATIONS

Chinese Office Action for corresponding application 201910165343.6 dated Sep. 30, 2020.
The Development of Key Manufacturing Industries in The World , Dec. 2016, Shanghai Municpal Economic Information Techology Commission.
Industry Patent Analysis Report (vol. 32)—New Type Display, edited by Tiejun Yang, Jun. 2015.

* cited by examiner

NEAR-EYE DISPLAY DEVICE AND NEAR-EYE DISPLAY SYSTEM

CROSS-REFERENCE TO RELATED APPLICATION

The present application is a National Stage of International Application No. PCT/CN2020/075607, filed on Feb. 17, 2020, which claims priority of a Chinese patent application having an application number 201910165343.6, entitled "NEAR-EYE DISPLAY DEVICE AND MANUFACTURING METHOD THEREOF" filed with China Patent Office on Mar. 5, 2019, and the entire disclosure of the application is incorporated herein by reference.

FIELD

The present disclosure relates to the technical field of semiconductor, and particularly to a near-eye display device and a near-eye display system.

BACKGROUND

Near-eye display (NED) devices such as head-mounted display (HMD) devices have been introduced into the consumer marketplace recently to support visualization technologies such as augmented reality (AR) and virtual reality (VR).

Waveguides may be used in a near-eye display device to convey light representing artificially-generated images from an image generation component of the device to the eyes of a user. For example, for a near-eye AR device, when a user views the real world through a waveguide, the user can see a computer-generated image projected from the transparent waveguide. In this way, the computer-generated images appear to be superimposed over the user's real-world environment.

SUMMARY

The present disclosure provides a near-eye display device and a near-eye display system, and the specific solutions are as follows.

An embodiment of the present disclosure provides a near-eye display device, wherein, the near-eye display device is configured to output an image of light of each pixel color emitted by a projection-based display; wherein the near-eye display device includes a plurality of first waveguide structures arranged in a stack, and an ingoing coupling grating structure and an outgoing coupling grating structure; wherein the ingoing coupling grating structure corresponds to the first wave guide structures in an one-to-one manner, the outgoing coupling grating structure corresponds to the first waveguide structures in an one-to-one manner;

at least one of the first waveguide structures corresponds to light of one pixel color, the ingoing coupling grating structure is configured to transmit the light of pixel colors emitted by the projection-based display into the first waveguide structures, and the outgoing coupling grating structure is configured to output the light of pixel colors;

the near-eye display device further includes an excitation light source structure configured to provide excitation light to at least one of the first waveguide structures; the outgoing coupling grating structure is further configured to output light of pixel colors corresponding to the first waveguide structures by irradiating and exciting through the excitation light.

In some embodiments of the present disclosure, the outgoing coupling grating structure includes: a monochromatic outgoing coupling grating made from a photoluminescent material.

In some embodiments of the present disclosure, the outgoing coupling grating structure comprises: an excitation-light outgoing coupling grating, a monochromatic outgoing coupling grating, and a photoluminescent film made from photoluminescent material, where the excitation-light outgoing coupling grating, the monochromatic outgoing coupling grating and the photoluminescent material film are arranged in a stack in sequence, the photoluminescent material film is plated on a side of the monochromatic outgoing coupling grating away from a first waveguide structure corresponding to the outgoing coupling grating structure; and the excitation-light outgoing coupling grating is configured to irradiate the excitation light to the photoluminescent film.

In some embodiments of the present disclosure, the excitation-light outgoing coupling grating and the monochromatic outgoing coupling grating are located on a same side of the first waveguide structure.

In some embodiments of the present disclosure, the excitation-light outgoing coupling grating and the monochromatic outgoing coupling grating are located on two sides of the first waveguide structure respectively.

In some embodiments of the present disclosure, the photoluminescent material is a quantum dot material.

In some embodiments of the present disclosure, the quantum dot material includes perovskite quantum dots.

In some embodiments of the present disclosure, the photoluminescent material is $MAPbI_{1.25}Br_{1.75}$ in an outgoing coupling grating structure which is excited and outputs red light, the photoluminescent material is $MAPbBr_3$ in an outgoing coupling grating structure which is excited and outputs green light, and the photoluminescent material is $MAPbCl_{2.25}Br_{0.75}$ in an outgoing coupling grating structure which is excited and outputs blue light;

wherein MA is $CH_3NH_3+$.

In some embodiments of the present disclosure, the excitation light source structure comprises a collimated excitation light source, a second waveguide structure or a plurality of second waveguide structure arranged in a stack, and an excitation-light ingoing coupling grating on a side of the second waveguide structure;

the second waveguide structure corresponds to the first waveguide structures in an one-to-one manner, the second waveguide structure is configured to receive excitation light emitted by the collimated excitation light source through the excitation-light ingoing coupling grating, and transmit received excitation light to a corresponding first waveguide structure.

In some embodiments of the present disclosure, when the excitation light source structure includes the plurality of the second waveguide structures arranged in a stack;

excitation-light ingoing coupling gratings located on a side of respective second waveguide structures are arranged alternately, so that the excitation light emitted by the collimated excitation light source respectively enters corresponding second waveguide structures.

In some embodiments of the present disclosure, the second waveguide structure and the corresponding first waveguide structure are an integral structure.

In some embodiments of the present disclosure, the second waveguide structures corresponds to the collimated excitation light source, and the collimated excitation light source emits ultraviolet light.

In some embodiments of the present disclosure, at least one of the outgoing coupling grating structures is located on a side of a corresponding first waveguide structure, the side faces the projection-based display.

Accordingly, an embodiment of the present disclosure further provides a near-eye display system, which includes a projection-based display and any of the above-mentioned near-eye display devices provided by embodiments of the present disclosure.

In some embodiments of the present disclosure, the projection-based display is a silicon-based LCD.

DETAILED DESCRIPTION OF THE EMBODIMENTS

In order to make objectives, technical solutions and advantages of the embodiments of the present disclosure apparent, the technical solutions of the embodiments of the present disclosure will be described in a clearly and fully understandable way in conjunction with the drawings related to the embodiments of the disclosure. It is obvious that the described embodiments are just a portion but not all of the embodiments of the present disclosure. Based on the described embodiments herein, those skilled in the art can obtain other embodiment(s), without any inventive work, which should be within the scope of the present disclosure.

Unless otherwise defined, the technical terms or scientific terms used herein have the ordinary meanings as commonly understood by those of ordinary skill in the art to which the present disclosure belongs. The terms "first," "second," and similar terms used in the art of the present disclosure, are not intended to indicate any sequence, amount or importance, but distinguish various components. The term "includes" or "including" or the like is intended to specify that the element or the object stated before the term encompasses the elements or the objects and equivalents thereof listed after the term, without excluding other elements or objects. The terms "connect", "connected", etc., are not limited to a physical connection or a mechanical connection, but may include an electrical connection, whether direct or indirect. "Up," "down," "right," "left" and the like are only used to indicate relative position relationship, and when the absolute position of the object which is described is changed, the relative position relationship can be changed accordingly.

In order to keep the following description of the embodiments of the present disclosure clear and concise, detailed descriptions of known functions and known components are omitted in the present disclosure.

Figure 1:
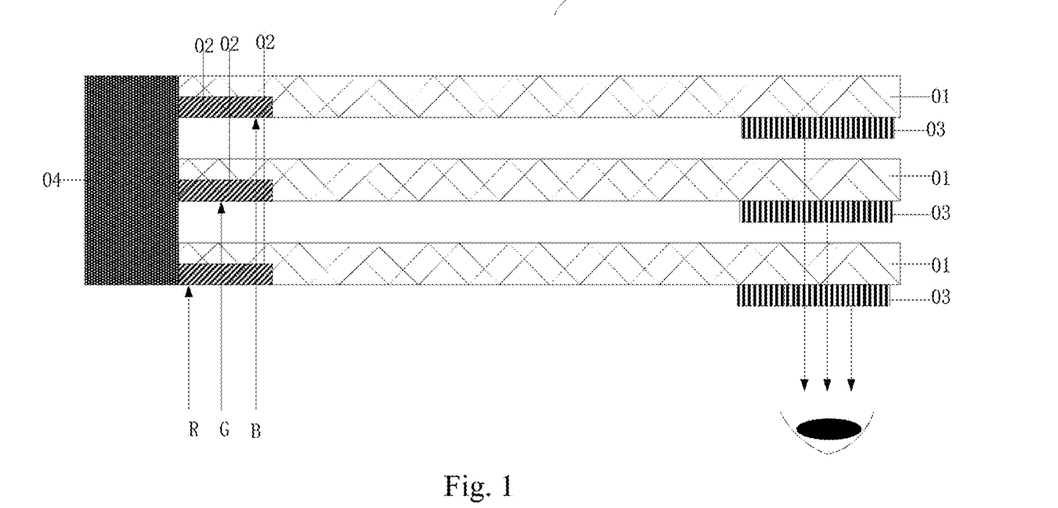
FIG. 1 is a first structural schematic diagram illustrating a near-eye display device provided by an embodiment of the present disclosure.

Referring to FIG. 1, an embodiment of the present disclosure provides a near-eye display device 1. The near-eye display device 1 is used for image output of light with each pixel color emitted by a projection-based display (not shown in FIG. 1) (light with R, G, and B pixel colors is illustrated as an example in FIG. 1), the near-eye display device includes a plurality of first waveguide structures 01 which are arranged by stacking, and ingoing coupling grating structures 02 and outgoing coupling grating structures 03 corresponding to the first waveguide structures 01.

Each of the first waveguide structures 01 corresponds to light with one pixel color, the ingoing coupling grating structure 02 corresponding to the first waveguide structure 01 is configured to transmit the light with a corresponding pixel color emitted by the projection-based display into the first waveguide structure 01, the outgoing coupling grating structure 03 corresponding to the first waveguide structure 01 is configured to output light with a pixel color corresponding to the first waveguide structure 01.

The near-eye display device further includes an excitation light source structure 04 for providing excitation light to at least one of the first waveguide structures 01 (the excitation light source structure 04 providing excitation light to each of the first waveguide structures 01 is illustrated as an example in FIG. 1); the outgoing coupling grating structure 03 corresponding to the first waveguide structure 01 receiving the excitation light is further configured to be irradiated by the excitation light received by the first waveguide structure 01, and be excited and output the light with a pixel color corresponding to the first waveguide structure 01.

In the near-eye display device provided by the embodiment of the present disclosure, not only is an excitation light source structure that provides excitation light to the first waveguide structure added, but also the outgoing coupling grating structure corresponding to the first waveguide structure receiving the excitation light can be irradiated by the excitation light received by the first waveguide structure, and be excited and output the light with a pixel color corresponding to the first waveguide structure. That is, the outgoing coupling grating structure corresponding to the first waveguide structure receiving the excitation light can derive the light with the corresponding pixel color emitted by the projection-based display, and be excited by the excitation light emitted by the excitation light source structure to output light with a pixel color corresponding to the first waveguide structure, so that the brightness of outputted light from the near-eye display device can be improved.

In some embodiments of the near-eye display device, the excitation light source structure may provide excitation light to only one of the first waveguide structures, and of course, may also provide excitation light to a plurality of or all of the first waveguide structures. According to actual requirements, as long as the outgoing light with a pixel color needs to be improved in brightness, the excitation light source structure may be disposed to provide excitation light for the first waveguide structure corresponding to the pixel color.

In some embodiments of the near-eye display device, as shown in FIG. 1, the ingoing coupling grating structure 02 corresponding to each of the first waveguide structures 01 is located on a side of the first waveguide structure 01 facing the projection-based display.

Further, in some embodiments of the near-eye display device, as shown in FIG. 1, the outgoing coupling grating structure 03 corresponding to each of the first waveguide structures 01 is located on a side of the first waveguide structure 01 facing the projection-based display. Of course, the outgoing coupling grating structure 03 corresponding to each of the first waveguide structures 01 is located on a side of the first waveguide structure 01 away from the projection-based display, which is not limited herein.

In some embodiments, the ingoing coupling grating structure corresponding to each of the first waveguide structures may be formed as slits by directly etching the surface of the corresponding first waveguide structure, or by forming a film of the ingoing coupling grating on the surface of the first waveguide structure and etching the film to form the ingoing coupling grating structure, or by attaching an ingoing coupling grating on the surface of the first waveguide structure to form the ingoing coupling grating.

In some embodiments of the near-eye display device may include three stacked first waveguide structures 01 (as shown in FIG. 1), and different ingoing coupling grating structures 02 provide corresponding first waveguide structures 01 with light with corresponding pixel colors emitted by the projection-based display respectively, such as, red light R, blue light B, and green light G, so that different first waveguide structures 01 transmit light with different pixel colors. The excitation light source structure 04 provides excitation light to each of the first waveguide structures, so that each of the first waveguide structures 01 transmits excitation light. Finally, each of the light coupling grating structures 03 can not only output the light with the pixel color transmitted by the first waveguide structure 01, but also be excited by irradiation of the excitation light and output light with the pixel color corresponding to the first waveguide structure 01, so that the brightness of outputted light from the near-eye display device can be improved.

Figure 2:
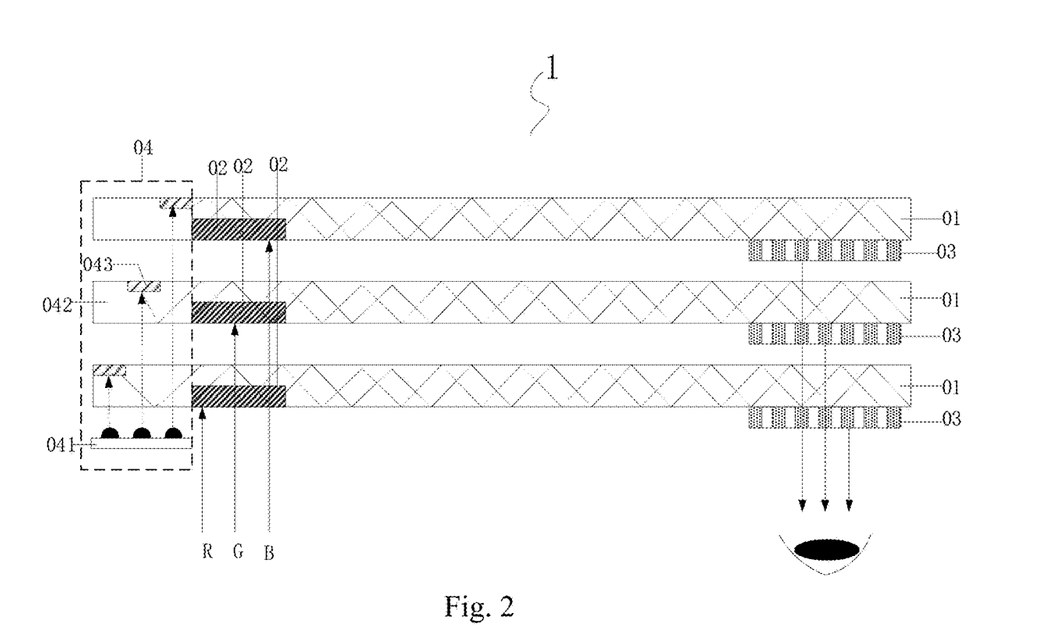
FIG. 2 is a second structural schematic diagram illustrating a near-eye display device provided by an embodiment of the present disclosure.

Optionally, in the near-eye display device provided by some embodiments of the present disclosure, as shown in FIG. 2, the outgoing coupling grating structure 03 corresponding to the first waveguide structure 01 receiving the excitation light includes a monochromatic outgoing coupling grating made from a photoluminescent material, thereby simplifying the structure of near-eye display devices. As the monochromatic outgoing coupling grating can out-couple monochromatic light in the first waveguide structure 01, and the photoluminescent material is excited by the excitation light in the first waveguide structure 01, thereby emitting light with a corresponding pixel color, and thus the brightness of outputted light is increased. Moreover, when the photoluminescent material is excited by the excitation light, the emitted light can be in any direction, thereby increasing the angle of view of the near-eye display device.

Further, in the near-eye display device provided by some embodiments of the present disclosure, the outgoing coupling grating structure may be formed by forming a photoluminescent material on the surface of the first waveguide structure and etching the photoluminescent material to form slits as the outgoing coupling grating structure, or by attaching a monochromatic outgoing coupling grating made from the photoluminescent material on the surface of the first waveguide structure.

Figure 3:
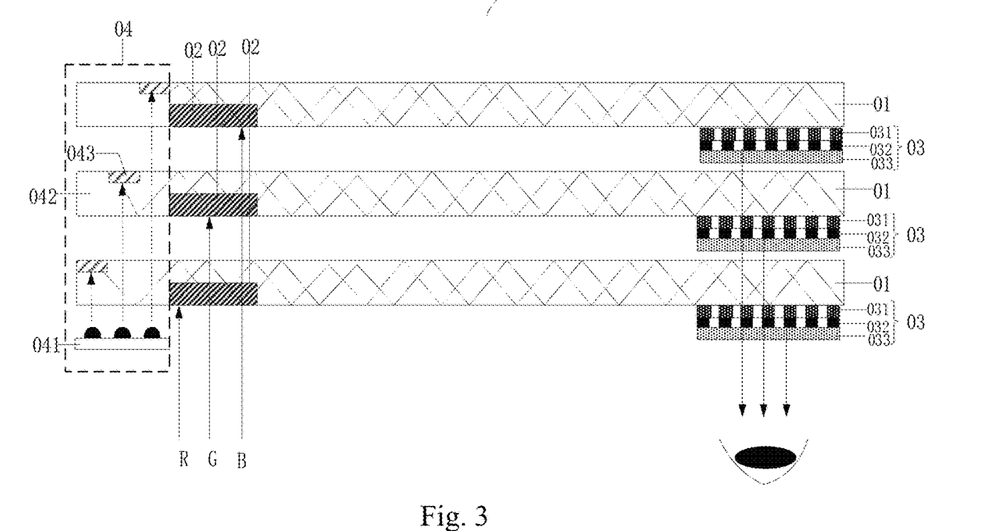
FIG. 3 is a third structural schematic diagram illustrating a near-eye display device provided by an embodiment of the present disclosure.
Figure 4:
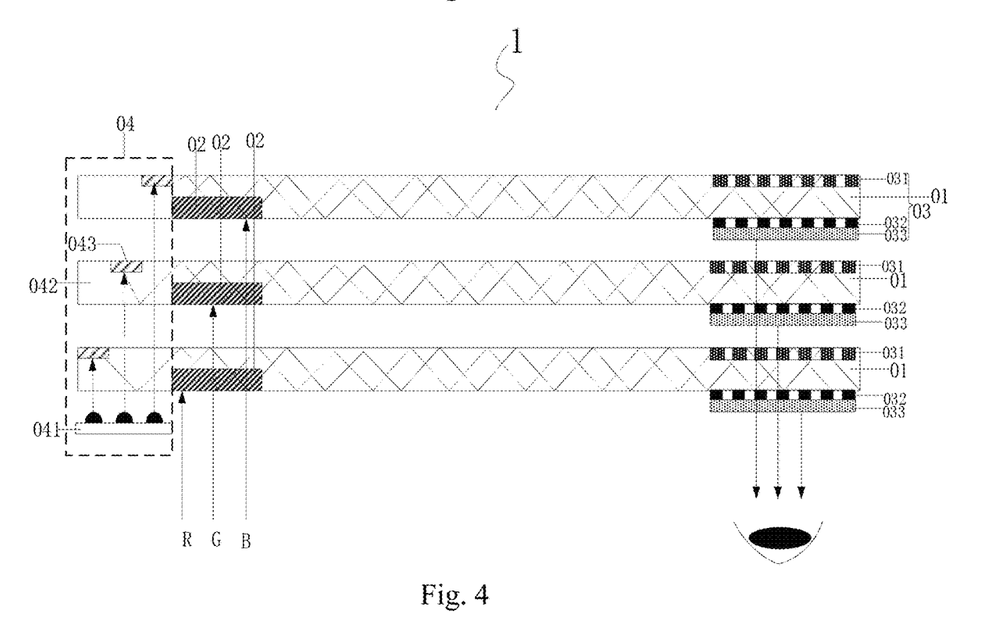
FIG. 4 is a fourth structural schematic diagram illustrating a near-eye display device provided by an embodiment of the present disclosure.

Optionally, in the near-eye display device provided by some embodiments of the present disclosure, as shown in FIG. 3 and FIG. 4, the outgoing coupling grating structure 03 corresponding to the first waveguide structure 01 receiving the excitation light includes: an excitation-light outgoing coupling grating 031 and a monochromatic outgoing coupling grating 032, and a photoluminescent film 033 made from a photoluminescent material which is plated on the side of the monochromatic outgoing coupling grating 032 away from the first waveguide structure 01. The excitation-light outgoing coupling grating 031, the monochromatic outgoing coupling grating 032 and the photoluminescent film 033 are arranged by stacking.

The excitation-light outgoing coupling grating 031 is configured to irradiate the excitation light received by the first waveguide structure 01 to the photoluminescent film 033.

In above embodiments, the excitation-light outgoing coupling grating 031 can irradiate the monochromatic outgoing coupling grating 032 accurately with excitation light, and the monochromatic outgoing coupling grating can out-couple monochromatic light in the first waveguide structure. At the same time, the excitation light in the first waveguide structure is out-coupled to irradiate the photoluminescent film 033 through the excitation-light outgoing coupling grating 031, and the photoluminescent film 033 is excited to emit light corresponding to the pixel color, thereby emitting light corresponding to the pixel color and increasing the brightness of outputted light. Moreover, when the photoluminescent material is excited by the excitation light, the emitted light can be in any direction, thereby increasing the angle of view of the near-eye display device.

Further, in the near-eye display device provided by some embodiments of the present disclosure, the excitation-light outgoing coupling grating 031 may specifically be a reflective grating.

Optionally, in the near-eye display device provided by some embodiments of the present disclosure, as shown in FIG. 3, the excitation-light outgoing coupling grating 031 and the monochromatic outgoing coupling grating 032 are located on the same side of the first waveguide structure 01.

Optionally, in the near-eye display device provided by some embodiments of the present disclosure, as shown in FIG. 4, the excitation-light outgoing coupling grating 031 and the monochromatic outgoing coupling grating 032 are located on two sides of the first waveguide structure 01 respectively.

Since quantum dot materials have many excellent optical properties, optionally, in the near-eye display device provided by some embodiments of the present disclosure, the photoluminescent material may be a quantum dot material.

Optionally, in the near-eye display device provided by some embodiments of the present disclosure, the quantum dot material includes perovskite quantum dots. Because perovskite quantum dots have good photoluminescent properties. Among them, the quantum efficiency of halogen-doped perovskite quantum dots can be up to 95%, and the full width at half maximum of the luminescent spectrum is very narrow. The monochromatic outgoing coupling grating formed by using a halogen-doped perovskite quantum dot material can make the light emitted by the monochromatic outgoing coupling grating have higher brightness and higher color purity.

Figure 5:
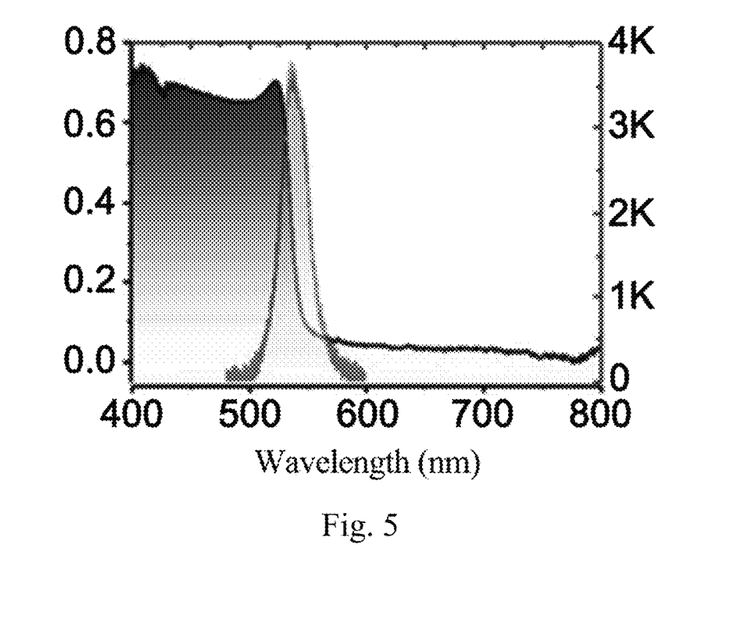
FIG. 5 is a first optical spectrum of a quantum dot luminescent material provided by an embodiment of the present disclosure.
Figure 6:
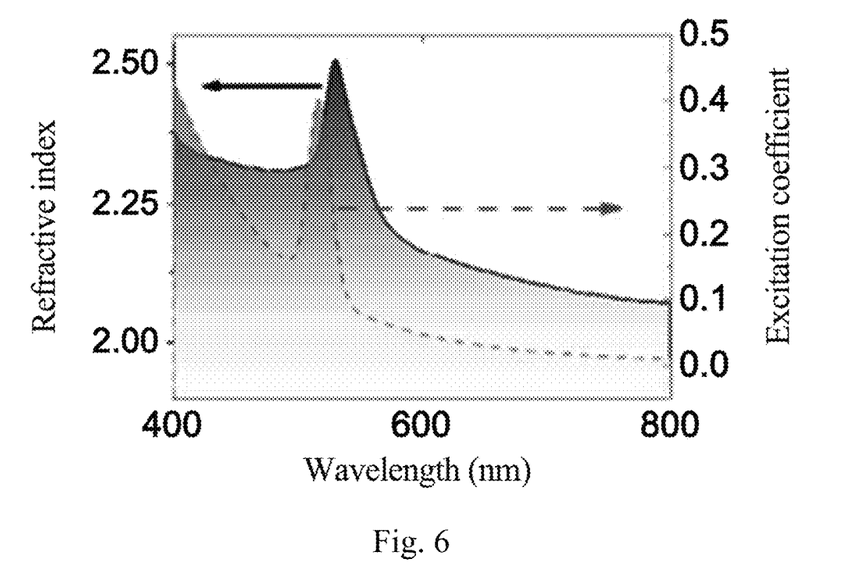
FIG. 6 is a second optical spectrum of a quantum dot luminescent material provided by an embodiment of the present disclosure.
Figure 7:
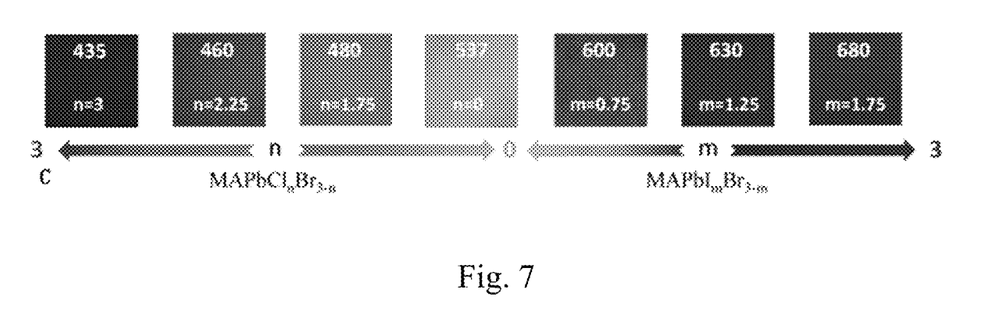
FIG. 7 is a diagram showing the correspondence relationship between quantum dot materials and emission wavelengths at different stoichiometric ratios of halogen elements provided by an embodiment of the present disclosure.

It is very easy to change the emission wavelength of the excitation light by adjusting the stoichiometric ratio of the halogen element. Taking lead halide perovskite for preparing the quantum dot grating as an example, the quantum dot grating has the structure of $MAPbX_3$, wherein MA represents $CH_3NH_3+$, and X may be Cl, Br, I or other halogen elements or a mixture thereof. It has a very good photoluminescent characteristic, high quantum efficiency and a narrow full width at half maximum. FIG. 5 illustrates the absorption (wide spectral line) and photoluminescent characteristic (narrow spectral line) of the $MAPbX_3$ material. FIG. 6 illustrates the refractive index (the spectrum corresponding to a solid arrow) and excitation coefficient (the spectrum corresponding to a dotted arrow) of the material. The refractive index is about 2.1~2.51 in the visible range, and the emission wavelength of the photoluminescent spectrum (PL) is about 538 nm. As can be seen from FIG. 7, the photoluminescent spectrum of the halogen-doped perovskite quantum dot material has a narrow full width at half maximum. FIG. 7 shows the luminescence wavelengths corresponding to the different stoichiometric ratios of halogen elements in $MAPbCl_nBr_{3-n}$ and $MAPbI_mBr_{3m}$. By changing the stoichiometric ratios of halogen elements, the band gap of the material can be changed, which in turn changes the PL emission wavelength.

Optionally, in the near-eye display device provided by some embodiments of the present disclosure, when the pixel color is red, in the outgoing coupling grating structure which is excited and outputs red light, the photoluminescent material is $MAPbI_{1.25}Br_{1.75}$, wherein MA is $CH_3NH_3+$. Referring to FIG. 7, the peak of the photoluminescent wavelength is located at 630 nm. When the pixel color is green, in the outgoing coupling grating structure which is excited and outputs green light, the photoluminescent material is $MAPbBr_3$, and the peak of the photoluminescent wavelength is located at 537 nm (refer to FIG. 7). When the pixel color is blue, in the outgoing coupling grating structure which is excited and outputs blue light, the photoluminescent material is $MAPbCl_{2.25}Br_{0.75}$, and the peak of the photoluminescent wavelength is located at 460 nm (refer to FIG. 7).

Figure 8:
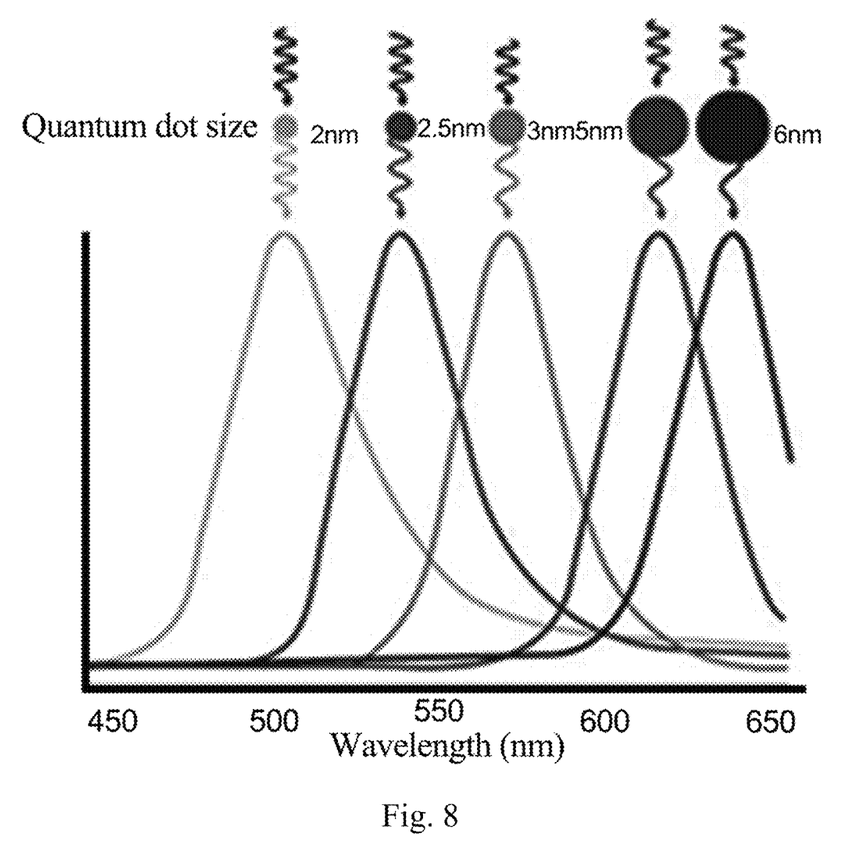
FIG. 8 is a photoluminescent diagram corresponding to different quantum dot sizes provided by an embodiment of the present disclosure.

Of course, other quantum dot materials can also be used for preparing a photoluminescent film. As for the photoluminescent film prepared by other quantum dot materials, the emission spectrum can be controlled by changing the size of the quantum dot. As shown in FIG. 8, by changing the size of the quantum dot and its chemical composition, its emission spectrum can cover the entire visible light region. Taking CdTe quantum as an example, when its particle size grows from 2.5 nm to 4.0 nm, its emission wavelength can be red-shifted from 510 nm to 660 nm. The emission wavelengths of silicon quantum dots and other quantum dots can reach the near infrared region.

Optionally, in the near-eye display device provided by some embodiments of the present disclosure, as shown in FIG. 2 to FIG. 4, the excitation light source structure 04 includes a collimated excitation light source 041, a second waveguide structure 042 or a plurality of the second waveguide structures 042 which are arranged by stacking, and excitation-light ingoing coupling gratings 043 on a side of the second waveguide structures 042.

Each of the second waveguide structures 042 corresponds to one of the first waveguide structures 01, the second waveguide structure 042 is configured to receive the excitation light emitted by the collimated excitation light source 041 through the excitation-light ingoing coupling grating 043, and transmit the received excitation light to the corresponding first waveguide structure 01.

Optionally, in the near-eye display device provided by some embodiments of the present disclosure, as shown in FIG. 2 to FIG. 4, each of the second waveguide structures 43 and the corresponding first waveguide structure 1 are an integrated structure, which can simplify the structure of the near-eye display device and decrease the cost.

Figure 9:
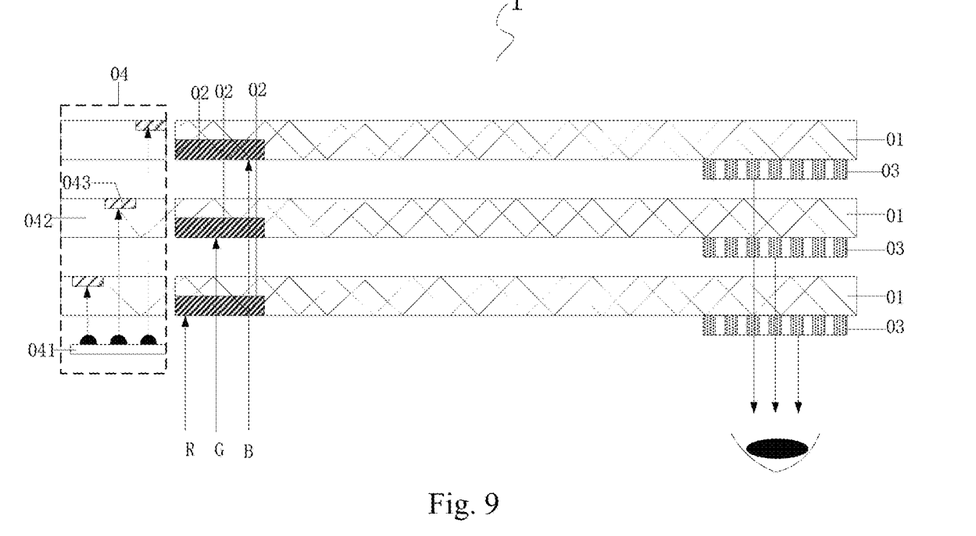
FIG. 9 is a fifth structural schematic diagram illustrating a near-eye display device provided by an embodiment of the present disclosure.

Of course, in some embodiments, each of the second waveguide structures and the corresponding first waveguide structure may also be independent structures. As shown in FIG. 9, it should be understood that FIG. 9 is only intended for illustrating that the second waveguide structure 042 and the corresponding first waveguide structure 01 are discrete structures. However, in some embodiments, in order not to affect the total reflection of the excitation light in the first waveguide structure and the second waveguide structure, the second waveguide structure and the first waveguide structure may be a closely-fitting structure.

In some embodiments, the entire excitation light source structure 04 may be disposed on the side end of the first waveguide structure 01. When the near-eye display device includes other components, the excitation light source structure 04 and other components may be located on the same side of the first waveguide structure 1.

Optionally, in the near-eye display device provided by some embodiments of the present disclosure, as shown in FIG. 2 to FIG. 4, the excitation light source structure 04 may be disposed on the side end of the first waveguide structure 01 where the ingoing coupling grating 02 is disposed. Of course, the excitation light source structure may also be disposed on the side end of the first waveguide structure where the outgoing coupling grating structure is disposed, which is not limited herein.

Further, in the near-eye display device provided by some embodiments of the present disclosure, as shown in FIG. 2 to FIG. 4, the excitation light source structure 04 includes a plurality of second waveguide structures 042 which are arranged by stacking, and the excitation-light ingoing coupling gratings 043 disposed on the side of each of the second waveguide structures 042 are arranged alternately, so that the excitation light emitted by the collimated excitation light source 041 is incident on the corresponding second waveguide structure 042, respectively.

Optionally, in the near-eye display device provided by some embodiments of the present disclosure, as shown in FIG. 2 to FIG. 4, each of the second waveguide structures 042 corresponds to the same collimated excitation light source 041, which can simplify the structure.

In some embodiments, when each of the second waveguide structures corresponds to the same collimated excitation light source, the light emitted by the collimated excitation light source is required to be able to simultaneously excite the photoluminescent material of the outgoing coupling grating structure corresponding to different first waveguide structures. For example, the collimated excitation light source is required to emit light which can simultaneously excite three materials, i.e., $MAPbCl_{1.25}Br_{1.75}$, $MAPbBr_3$, $MAPbCl_{2.25}Br_{0.75}$, to emit light, and have higher energy. For example, the light emitted by the collimated excitation light source is ultraviolet light.

Figure 10:
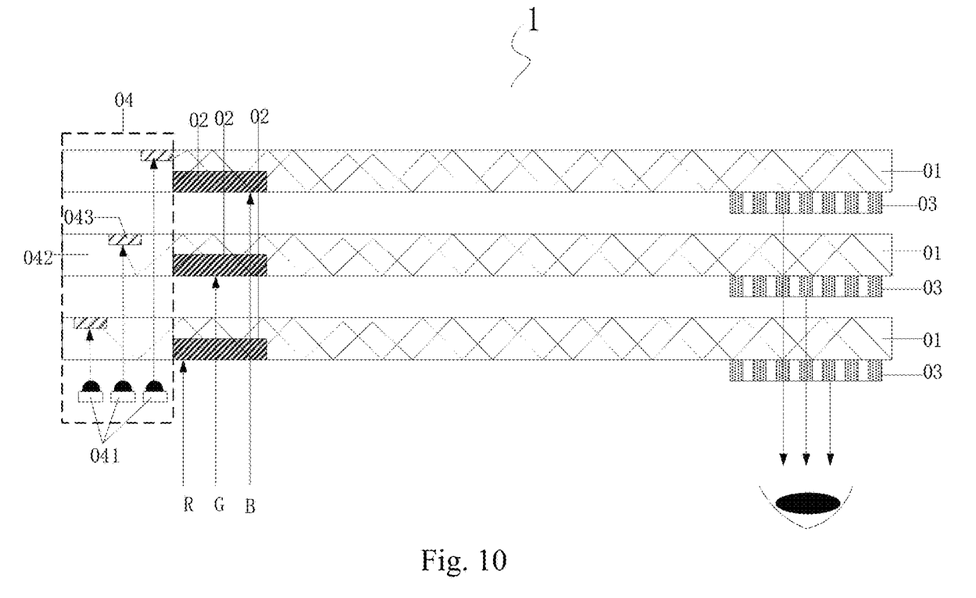
FIG. 10 is a sixth structural schematic diagram illustrating a near-eye display device provided by an embodiment of the present disclosure.

Of course, in some embodiments, as shown in FIG. 10, each of the second waveguide structures 042 may also correspond to a collimated excitation light source 041, respectively. At this time, the light emitted by the collimated excitation light source 041 corresponding to each of the second waveguide structures 042 may be the optimal excitation wavelength required for the corresponding outgoing coupling grating structure 033, so that the light outputted from different outgoing coupling grating structures 03 may be the strongest in intensity, thereby further improving the brightness of outputted light from the near-eye display device.

Figure 11:
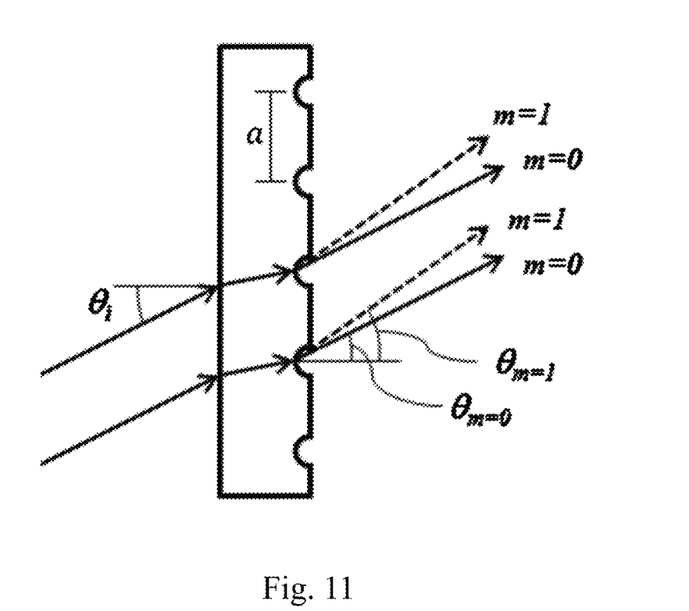
FIG. 11 is a schematic diagram illustrating grating diffraction provided by an embodiment of the present disclosure.
Figure 12:
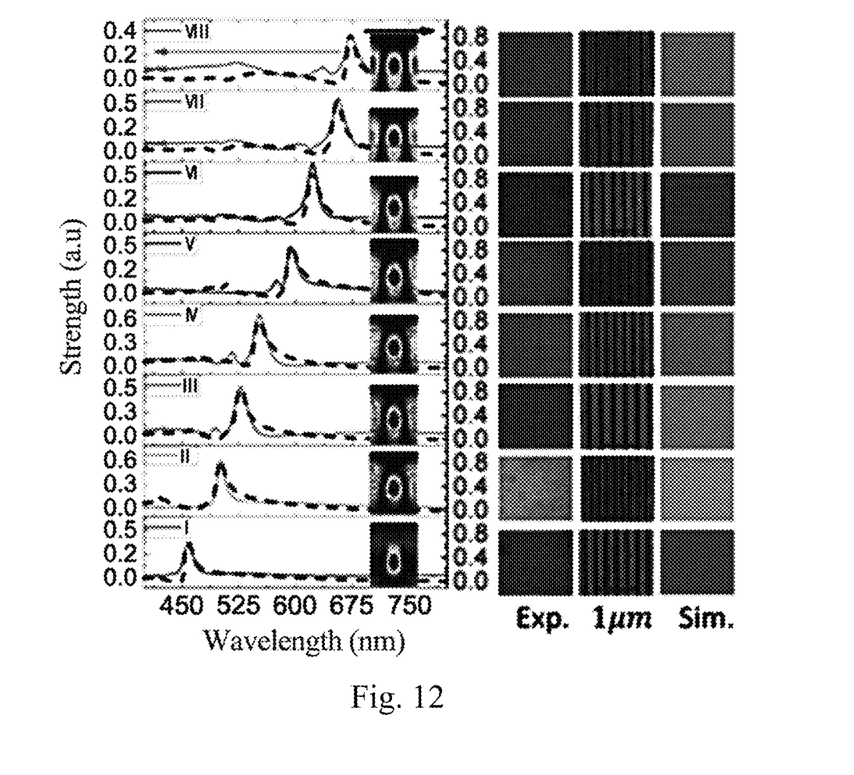
FIG. 12 is a schematic diagram illustrating corresponding emission wavelengths at different grating periods provided by an embodiment of the present disclosure.

In some embodiments, the transmission grating can be constructed by scoring repeating, parallel structures on the transparent substrate. The repeating structures can be seen as many closely spaced thin slits. This structure creates areas where light may be scattered. In order to better understand the grating structure involved in the present disclosure, as shown in FIG. 11, the present disclosure provides a schematic diagram illustrating the principle of a perspective grating for diffracting light, which includes repetitive, narrow-width grooves with a spacing of a. The incident light impinges on the grating at an angle of which is measured from the surface normal. The light with order m outputted from the grating is emitted at an angle of $\theta_m$. This angle is measured relative to the surface normal. Using the grating equation (a $\sin(\theta_m)=m\lambda$), applicable to the diffraction grating at $\theta_i=0°$), the expression of the transmission grating can be obtained: $a[\sin(\theta_m)-\sin(\theta_i)]=m\lambda$. The above equation shows that, according to the value of $\Delta$, gratings with a spacing of a will deflect light at their respective angles (Om), wherein m is the main maximum order. For a given order m, light with different wavelengths will exit the grating at different angles. FIG. 12 illustrates emission wavelengths (left graph in FIG. 12) corresponding to different simulated grating periods (right graph in FIG. 12) provided by embodiments of the present disclosure, wherein, the middle part of the right graph in FIG. 12 is structure diagrams illustrating gratings with different slit periods under an electron microscope, the left part of the right graph in FIG. 12 is physical schematic diagrams of experimentally produced gratings, and the right part of the right graph in FIG. 12 is schematic diagrams illustrating simulated gratings. In the present disclosure, the grating periods of the photoluminescent light-emitting components corresponding to RGB respectively are: p=400 nm; 320 nm; 280 nm, and the intervals are d=70 nm; 80 nm; 163 nm, respectively. The interval refers to the interval between two quantum dot gratings, corresponding to the width of the groove in FIG. 11. The thickness of the photoluminescent membrane of the photoluminescent light-emitting component is generally selected to be about 200 nm.

In some embodiments, the monochromatic outgoing coupling grating made from a quantum dot material, that is, a quantum dot grating, can be obtained by electron beam lithography and ICP etching. The details are as follows.

Firstly, a quantum dot film is prepared. The quantum dot film is generally prepared by spin-coating through solution method, i.e., for the MAPbX3 perovskite film, 3 mmol of CH3NH3Br and PbBr2 are dissolved in DMSO (dimethyl sulfoxide) solvent to form CH3NH3BrPbBr2 (1.5 mmol/L), and the solution is spin-coated on the substrate for nucleation, precipitation, and crystallization treatment.

Secondly, a quantum dot grating is prepared. A photoresist (about 300 nm) is coated on the quantum dot film, patterned directly with an electron beam, and then etched by using plasma etching technology.

Finally, the well-fabricated quantum dot grating structure is attached at the light-emitting position of the first waveguide structure to form a photoluminescent light-emitting component, wherein the substrate of the quantum dot grating is in contact with the first waveguide structure.

In some embodiments, a quantum dot film may also be directly prepared on the surface of the first waveguide structure to form a quantum dot grating. Specifically, it may include: forming a quantum dot photoluminescent film at the light-emitting position of the first waveguide structure; and patterning the quantum dot photoluminescent membrane to form a quantum dot grating.

Figure 13:
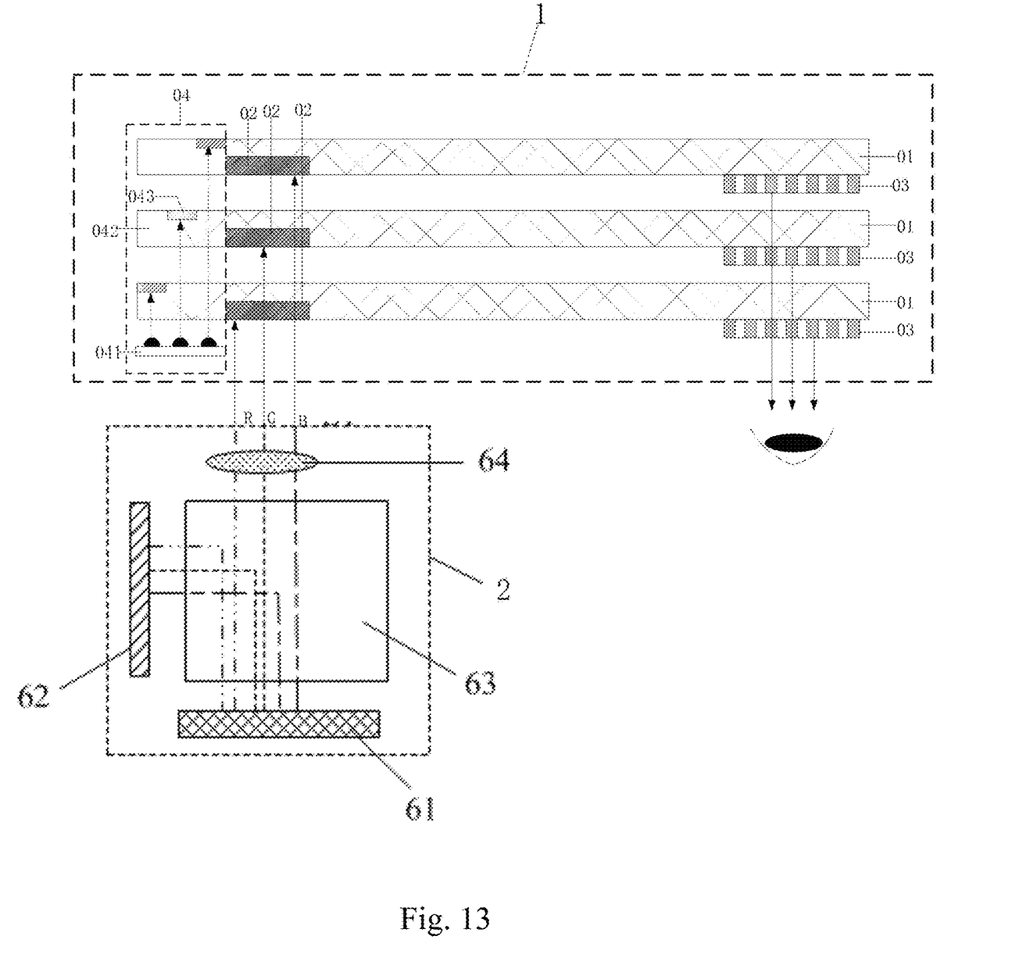
FIG. 13 is a structural schematic diagram illustrating a near-eye display system provided by an embodiment of the present disclosure.

Based on the same inventive concept, an embodiment of the present disclosure further provides a near-eye display system, as shown in FIG. 13, which includes a projection-based display 2 and any one of the near-eye display device 1 provided by the foregoing embodiment of the present disclosure.

In some embodiments, the collimated excitation light source 41 and the projection-based display 2 may be located on the same side of the first waveguide structure 01.

Optionally, in the near-eye display system provided by embodiments of the present disclosure, the projection-based display is a silicon-based LCD.

As shown in FIG. 13, the projection-based display 2 may specifically include a reflective Liquid Crystal On Silicon, LCOS 61, an LED light source 62, a Polarization Beam Splitter, PBS 63, and a collimating structure 64. The reflective LCOS 61 generates image information by being illuminated by the RGB LED light source 62, which exits through the PBS beam splitter 63, thereby providing the light with RGB pixel colors for the human eyes through the near-eye display device.

In some embodiments, when the collimated excitation light source 41 has a transparent structure, it is integrated into the projection-based display 2. In some embodiments of the present disclosure, the collimated excitation light source is a transparent structure integrated into the image generating structure, which can simplify the structure of the near-eye display device.

The beneficial effects of embodiments of the present disclosure are as follows: in the near-eye display device provided by embodiments of the present disclosure, not only is an excitation light source structure that provides excitation light to the first waveguide structure added, but also the outgoing coupling grating structure corresponding to the first waveguide structure receiving the excitation light can be irradiated by the excitation light received by the first waveguide structure, and be excited and output the light with a pixel color corresponding to the first waveguide structure. That is, the outgoing coupling grating structure corresponding to the first waveguide structure receiving the excitation light can derive the light with the corresponding pixel color emitted by the projection-based display, and be excited by the excitation light emitted by the excitation light source structure to output light with a pixel color corresponding to the first waveguide structure, so that the brightness of light emitted by the near-eye display device can be improved.

It is apparent that the present disclosure can be changed and modified by those skilled in the art without departure from the spirit and scope of the disclosure. In this way, if the above-mentioned changes and modifications of the present disclosure belong to the scope of the claims of the present disclosure and its equivalent technologies, the present disclosure is intended to include the above changes and modifications.

What is claimed is:

1. A near-eye display device configured to output an image of light of each pixel color emitted by a projection-based display; wherein the near-eye display device comprises a plurality of first waveguide structures arranged in a stack, and an ingoing coupling grating structure and an outgoing coupling grating structure; wherein each of first wave guide structures comprises a corresponding ingoing coupling grating of the ingoing coupling grating structure and a corresponding outgoing coupling grating of the outgoing coupling grating structure;
at least one of the first waveguide structures corresponds to light of one pixel color, the ingoing coupling grating structure is configured to transmit the light of pixel colors emitted by the projection-based display into the first waveguide structures, and the outgoing coupling grating structure is configured to output the light of pixel colors;
the near-eye display device further comprises an excitation light source structure configured to provide excitation light to at least one of the first waveguide structures; the outgoing coupling grating structure is further configured to output light of pixel colors corresponding to the first waveguide structures by irradiating and exciting through the excitation light;
wherein the outgoing coupling grating structure comprises: an excitation-light outgoing coupling grating, a monochromatic outgoing coupling grating, and a photoluminescent film made from photoluminescent material, where the excitation-light outgoing coupling grating, the monochromatic outgoing coupling grating and the photoluminescent material film are arranged in a stack in sequence, the photoluminescent material film is plated on a side of the monochromatic outgoing coupling grating away from a first waveguide structure corresponding to the outgoing coupling grating structure; and
the excitation-light outgoing coupling grating is configured to irradiate the excitation light to the photoluminescent film.

2. The near-eye display device according to claim 1, wherein,
the outgoing coupling grating structure comprises: a monochromatic outgoing coupling grating made from a photoluminescent material.

3. The near-eye display device according to claim 2, wherein,
the photoluminescent material is a quantum dot material.

4. The near-eye display device according to claim 3, wherein, the quantum dot material comprises perovskite quantum dots.

5. The near-eye display device according to claim 4, wherein,
the photoluminescent material is $MAPbI_{1.25}Br_{1.75}$ in an outgoing coupling grating structure which is excited and outputs red light,
the photoluminescent material is $MAPbBr_3$ in an outgoing coupling grating structure which is excited and outputs green light,
and the photoluminescent material is $MAPbCl_{2.25}Br_{0.75}$ in an outgoing coupling grating structure which is excited and outputs blue light;
wherein MA is $CH3NH3+$.

6. The near-eye display device according to claim 1, wherein,
the excitation-light outgoing coupling grating and the monochromatic outgoing coupling grating are located on a same side of the first waveguide structure.

7. The near-eye display device according to claim 1, wherein,
the excitation-light outgoing coupling grating and the monochromatic outgoing coupling grating are located on two sides of the first waveguide structure respectively.

8. The near-eye display device according to claim 1, wherein,
the excitation light source structure comprises a collimated excitation light source, a second waveguide structure or a plurality of second waveguide structures, and an excitation-light ingoing coupling grating on a side of the second waveguide structure;
the second waveguide structure corresponds to the first waveguide structures in an one-to-one manner, the second waveguide structure is configured to receive excitation light emitted by the collimated excitation light source through the excitation-light ingoing coupling grating, and transmit received excitation light to a corresponding first waveguide structure.

9. The near-eye display device according to claim 8, wherein,
the excitation light source structure comprises the plurality of the second waveguide structures arranged in a stack;
excitation-light ingoing coupling gratings located on a side of respective second waveguide structures are arranged alternately, so that the excitation light emitted by the collimated excitation light source respectively enters corresponding second waveguide structures.

10. The near-eye display device according to claim 8, wherein,
the second waveguide structure and the corresponding first waveguide structure are an integral structure.

11. The near-eye display device according to claim 8, wherein,
the second waveguide structures corresponds to the collimated excitation light source, and the collimated excitation light source emits ultraviolet light.

12. The near-eye display device according to claim 1, wherein,
at least one of the outgoing coupling grating structures is located on a side of a corresponding first waveguide structure, the side faces the projection-based display.

13. A near-eye display system, comprising a projection-based display and the near-eye display device according to claim 1.

14. The near-eye display system according to claim 13, wherein, the projection-based display is a silicon-based LCD.

* * * * *